United States Patent
Seto et al.

(10) Patent No.: US 6,624,102 B2
(45) Date of Patent: Sep. 23, 2003

(54) ULTRAVIOLET AND INFRARED RADIATION ABSORBING GREEN GLASS

(75) Inventors: Hiromitsu Seto, Osaka (JP); Yukihito Nagashima, Osaka (JP); Shigekazu Yoshii, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 31 days.

(21) Appl. No.: 09/953,283

(22) Filed: Sep. 17, 2001

(65) Prior Publication Data

US 2002/0058579 A1 May 16, 2002

(30) Foreign Application Priority Data

Sep. 18, 2000 (JP) ........................ 2000-281580

(51) Int. Cl.⁷ .............................................. C03C 3/087
(52) U.S. Cl. ....................................................... 501/71
(58) Field of Search ............................................ 501/71

(56) References Cited

U.S. PATENT DOCUMENTS 5,318,931 A * 6/1994 Nakaguchi et al. ........... 501/64
5,478,783 A * 12/1995 Higby et al. .................. 501/27
5,837,629 A * 11/1998 Combes et al. ............... 501/70

FOREIGN PATENT DOCUMENTS

| EP | 677492 A | * 10/1995 |
| EP | 952123 A | * 10/1999 |
| EP | 965570 A | * 12/1999 |
| JP | 57-106537 A | 2/1982 |

* cited by examiner

*Primary Examiner*—David Sample
(74) *Attorney, Agent, or Firm*—Sughrue Mion, PLLC

(57) ABSTRACT

An ultraviolet and infrared radiation absorbing green glass comprises: in % by weight, as coloring components, 0.5 to 1.1%, excluding 0.5%, total iron oxide in terms of $Fe_2O_3$; 0 to 2.0% $CeO_2$, 0 to 1.0% $TiO_2$; 0.0005 to 0.01% NiO; and 0.0001 to 0.001% CoO; wherein, when the glass has a thickness of 4 mm, the glass has a visible light transmittance of 70% or more, a total solar energy transmittance of 60% or less, and an ultraviolet transmittance defined by ISO 9050 of 25% or less.

9 Claims, No Drawings

ULTRAVIOLET AND INFRARED RADIATION ABSORBING GREEN GLASS

FIELD OF THE INVENTION

The present invention relates to an ultraviolet and infrared radiation absorbing glass having a high visible light transmittance and a green tint. More particularly, the invention relates to an ultraviolet and infrared radiation absorbing green glass which, when heat-tempered before use, is inhibited from changing in color through the heat-tempering and which is hence especially suitable for use as an automotive window glass.

BACKGROUND OF INVENTION

In order to meet the demand for protection of interior trim of automobiles against deterioration, which has been increasing with the recent trend to luxury of the interior trim, and to reduce the load of air conditioning, various glasses having ultraviolet and infrared radiation absorbing power have recently been proposed as automotive window glasses.

Among the automotive window glasses, the front or side window glasses should have a visible light transmittance of not less than a certain value so as to secure driver's view. Glasses which have been designed for use in such a position and to which ultraviolet radiation absorbing properties and heat radiation absorbing properties have been imparted, have a greenish tint because an end of the ultraviolet absorption range and an end of the infrared absorption range reside in the visible region.

Window glasses which have an ultraviolet transmittance of about 38% or less and a total solar energy transmittance of about 46% or less and which further have a visible light transmittance of at least 70% so as to secure a view from the inside of the automobile have conventionally been known (see, for example, JP-A-3-187946). (The term "JP-A" as used herein means an "unexamined published Japanese patent application".)

It is known that one method effective in reducing the total solar energy transmittance of a glass is to increase the absolute amount of ferrous oxide among the iron oxides contained in the glass. Most of the infrared radiation absorbing glasses which have been proposed so far are produced with this technique.

On the other hand, various techniques for reducing ultraviolet transmittance have been proposed. For example, the infrared and ultraviolet radiation absorbing glass disclosed in JP-A-4-193738 contains cerium oxide and titanium oxide so as to have a reduced ultraviolet transmittance. This glass comprises, in % by weight, base glass components comprising 68 to 72% $SiO_2$, 1.6 to 3.0% $Al_2O_3$, 8.5 to 11.0% CaO, 2.0 to 4.2% MgO, 12.0 to 16.0% $Na_2O$, and 0.5 to 3.0% $K_2O$ and, coloring components comprising 0.65 to 0.75% $Fe_2O_3$, 0.20 to 0.35% $CeO_2$, and 0.2 to 0.4% $TiO_2$.

The ultraviolet radiation absorbing glass disclosed in JP-A-6-56466 which has a green tint, comprises a soda-lime-silica glass as base glass components and, coloring components comprising 0.53 to 0.70% total iron oxide in terms of $Fe_2O_3$, 0.5 to 0.8% $CeO_2$, and 0.2 to 0.4% $TiO_2$, wherein 30 to 40% of the total iron oxide in terms of $Fe_2O_3$ is accounted for by FeO in terms of $Fe_2O_3$.

The ultraviolet and infrared radiation absorbing glass disclosed in JP-B-6-88812 (the term "JP-B" as used herein means an "examined Japanese patent publication") which has a green tint comprises, in % by weight, base glass components comprising 65 to 75% $SiO_2$, 0 to 3% $Al_2O_3$, 1 to 5% MgO, 5 to 15% CaO, 10 to 15% $Na_2O$, and 0 to 4% $K_2O$ and, coloring components comprising 0.65 to 1.25% total iron oxide in terms of $Fe_2O_3$ and either 0.2 to 1.4% $CeO_2$ or a combination of 0.1 to 1.36% $CeO_2$ and 0.02 to 0.85% $TiO_2$.

Furthermore, glasses which have a preferred tint by adding nickel oxide have been proposed. For example, the glass disclosed in JP-W-8-506314 (the term "JP-W" as used herein means an "unexamined published PCT application") comprises a soda-lime-silica glass having a ferrous content calculated with the following equation:

FeO (wt %)$\geq$0.007+[(optical density)−0.036]/2.3 and contains 0.25 to 1.75% by weight $Fe_2O_3$. It further contains one or more members selected from the group consisting of Se, $Co_3O_4$, $Nd_2O_3$, NiO, MnO, $V_2O_5$, $CeO_2$, $TiO_2$, CuO, and SnO and thereby has an neutral tint. This glass has a visible light transmittance of 32% or more, an ultraviolet transmittance of 25% or less, and a solar heat radiation transmittance lower by at least 7% than the visible light transmittance, when it has a thickness of 4 mm. It preferably has a dominant wavelength shorter than 570 nm.

The glasses disclosed in the patent documents cited above have ultraviolet radiation absorbing power by $Fe_2O_3$, $CeO_2$, and $TiO_2$ and by interactions among them. However, glasses containing these ingredients assume a yellow tint through heat-tempering. Although the reasons for this color change are unclear, it may be due to the fact that an increase in absorption is observed, which is presumably attributable mainly to an interaction between $Fe_2O_3$ and $CeO_2$. Because of this, a glass plate produced and a glass plate obtained by processing (heat-tempering) the glass plate so as to be actually usable as an automotive window glass differ in tint. In this respect, those conventional glasses have had a drawback in quality control. In particular, an increase in saturation caused by heat-tempering is undesirable because the color becomes more vivid.

On the other hand, in the glasses containing NiO, the color change through heat-tempering can be inhibited due to the absorption by tetra-coordinated NiO after heat-tempering in combination with the coloration in yellow mentioned above. However, the conventional glasses containing NiO have too low a visible light transmittance or too high an ultraviolet or infrared transmittance and are hence unsatisfactory for use as automotive window glasses.

SUMMARY OF THE INVENTION

The invention has been made in the light of the above-described circumstances of the conventional techniques. An object of the invention is to provide an ultraviolet and infrared radiation absorbing green glass which has a high visible light transmittance, a low ultraviolet transmittance, and a low infrared transmittance, changes little in color through heat-tempering, and retains a stable green tint. Another object of the invention is to provide an ultraviolet and infrared radiation absorbing green glass which, in addition to these properties, has a lower total solar energy transmittance than conventional ones due to the infrared absorption by NiO and which therefore is especially suitable for use as an automotive window glass.

(1) The invention provides an ultraviolet and infrared radiation absorbing green glass comprising: in % by weight, as coloring components,
0.5 to 1.1%, excluding 0.5%, total iron oxide in terms of
$Fe_2O_3$ (T—$Fe_2O_3$);
0 to 2.0% $CeO_2$;
0 to 1.0% $TiO_2$;
0.0005 to 0.01% NiO; and
0.0001 to 0.001% CoO;

wherein, when the glass has a thickness of 4 mm, the glass has a visible light transmittance (YA) of 70% or more, a total solar energy transmittance (TG) of 60% or less, and an ultraviolet transmittance defined by ISO 9050 (Tuv) of 25% or less (2) In the glass of the invention, the preferred content of $CeO_2$ is from 0.1 to 2.0% by weight.

(3) The glass of the invention preferably comprises: in % by weight, as base glass components,
65 to 80% $SiO_2$;
0 to 5% $Al_2O_3$;
0 to 10% MgO;
5 to 15% CaO:
10 to 20% $Na_2O$;
0 to 5% $K_2O$; and
0 to 5% $B_2O_3$;

wherein the sum of MgO and CaO is 5 to 15% and the sum of $Na_2O$ and $K_2O$ is 10 to 20%.

(4) In the glass of the invention, the content of T—$Fe_2O_3$ is preferably from 0.6 to 1.1%, excluding 0.6%.

(5) FeO in terms of $Fe_2O_3$ preferably accounts for 20 to 60% of the T—$Fe_2O_3$.

(6) The glass of the invention preferably contains 0.0001 to 0.1% in total of at least one selected from the group consisting of Se, $Cr_2O_3$, $Mn_2O_3$, CuO, $Nd_2O_3$, $Er_2O_3$, $MoO_3$, $V_2O_5$, and $La_2O_3$.

(7) The glass of the invention preferably, when the glass has a thickness of 4 mm, has a visible light transmittance (YA) of 70% or more, a total solar energy transmittance (TG) of 53% or less, and an ultraviolet transmittance defined by ISO 9050 (Tuv) of 20% or less.

(8) In the glass of the invention, the difference in a saturation between the glass before a heat treatment and that after the treatment is preferably within 0.5. The saturation is determined from chromaticities a* and b* in the CIE 1976 L*a*b* color system using the following equation (1) (hereinafter referred to as "saturation"):

$$\text{Saturation} = (a^{*2} + b^{*2})^{1/2} \quad (1)$$

(9) The heat treatment is preferably a heat-tempered treatment by air blast cooling.

(10) The glass is especially preferably a sheet glass formed by the float process and has undergone heat-tempering.

DETAILED DESCRIPTION OF THE INVENTION

Modes for carrying out the invention will be described below in detail.

First, the reasons for limitations of the composition of the ultraviolet and infrared radiation absorbing green glass according to the invention are explained below. Hereinafter, all percents used for component amounts are by weight.

Iron oxide in a glass is present in the forms of $Fe_2O_3$, and FeO. $Fe_2O_3$ is a component which serves to enhance ultraviolet radiation absorbing power, while FeO is a component which serves to enhance heat radiation absorbing power.

If the amount of the total iron oxide in terms of $Fe_2O_3$ (T—$Fe_2O_3$) is less than 0.5%, the effect of absorbing ultraviolet and infrared radiation is so low that the desired optical properties cannot be obtained. On the other hand, contents of T—$Fe_2O_3$ exceeding 1.1% are undesirable in that the glass has a reduced visible light transmittance. Such too high T—$Fe_2O_3$ contents are undesirable also in that, when this glass and a glass having a different composition are successively produced with the same glass melting furnace, the compositional change requires much time. Consequently, the content of T—$Fe_2O_3$ is from 0.5 to 1.1%, excluding 0.5%, preferably from 0.6 to 1.1%, excluding 0.6%.

NiO is a component for regulating visible light transmittance and color tone. In the invention, NiO plays an especially important role in controlling the color tones before and after a heat treatment. If the content of NiO is less than 0.0005%, the sufficient effect cannot be obtained. On the other hand, contents thereof exceeding 0.01% are undesirable in that the visible light transmittance is decreased.

It is known that NiO changes in coordination number depending on the cooling rate of the glass, resulting in a different color tone. Specifically, the coordination number for the oxygen surrounding $Ni^{2+}$ changes from 6 to 4 through heat-tempering, and this change brings about a change in absorption. $Ni^{2+}$ of octahedral coordination has absorption at around 430 nm to color the glass yellow-brown, while $Ni^{2+}$ of tetrahedral coordination has absorption in the range of from 500 to 640 nm. In the invention, this property of NiO is utilized to control the color tones before and after a heat treatment.

CoO is a component for obtaining a green tint in cooperation with NiO and $Fe_2O_3$, and further serves to control visible light transmittance. If the content of CoO is less than 0.0001%, a desirable green tint cannot be obtained. If the content of CoO exceeds 0.001%, the results are too intense a blue tint and a reduced visible light transmittance.

$CeO_2$, although not an essential component, is a component which enhances ultraviolet radiation absorbing power. $CeO_2$ in a glass is present in the form of $Ce^{3+}$ or $Ce^{4+}$. In particular, $Ce^{3+}$ shows reduced absorption in the visible region and is effective in ultraviolet absorption. $Ce^{3+}$ functions also to enhance ultraviolet radiation absorbing power by an interaction with $Fe^{3+}$. The content of $CeO_2$ is preferably not less than 0.1%, whereby, a sufficient ultraviolet radiation absorbing power can be obtained. Use of $CeO_2$ in an amount more than 2% is undesirable in that the results are an increased cost and a reduced visible light transmittance.

$TiO_2$, although not an essential component, serves to enhance ultraviolet radiation absorbing power by an interaction with FeO. It may be added in an appropriate amount. If the content of $TiO_2$ is too high, the glass tends to be yellowish. Consequently, the upper limit of $TiO_2$ content should be 1.0%, and is preferably 0.8%, more preferably 0.1%.

From the standpoint of obtaining the green tint and properties which the invention is intended to attain, it is preferred that at least one member selected from the group consisting of Se, $Mn_2O_3$, CuO, $Cr_2O_3$, $Nd_2O_3$, $Er_2O_3$, $MoO_3$, $V_2O_5$ and $La_2O_3$ can be added to a glass having a composition within the range according to the invention in an amount of from 0.0001 to 0.1%. Se, $Mn_2O_3$, CuO, $Cr_2O_3$, $Nd_2O_3$ and $Er_2O_3$ can function as auxiliary coloring agents and $MoO_3$, $V_2O_5$ and $La_2O_3$ can function as auxiliary ultraviolet absorbers.

$SiO_2$ is a main component forming a skeleton of glass. If the content of $SiO_2$ is less than 65%, the glass has poor durability. If the content thereof exceeds 80%, the glass is difficult to melt.

$Al_2O_3$ is a component which improves glass durability. It the content of $Al_2O_3$ exceeds 5%, the glass is difficult to melt. The preferred range of $Al_2O_3$ content is from 0.1 to 2%.

MgO and CaO both are used for improving glass durability and for regulating the liquidus temperature and viscosity of the glass during forming. If the content of MgO exceeds 10%, the liquidus temperature rises. If the content of CaO is less than 5% or higher than 15%, the liquidus temperature rises. If the total content of MgO and CaO is less than 5%, the glass has poor durability. If the total content thereof exceeds 15%, the liquidus temperature rises.

$Na_2O$ and $K_2O$ accelerate glass melting. If the content of $Na_2O$ is less than 10% or if the total content of $Na_2O$ and $K_2O$ is less than 10%, the effect of melting acceleration is poor. If the content of $Na_2O$ exceeds 20% or if the total content of $Na_2O$ and $K_2O$ exceeds 20%, glass durability is decreased. Since too large $K_2O$ amounts result in an increased cost, it is desirable to use $K_2O$ in an amount of 5% or less.

$B_2O_3$ is a component used for improving glass durability or as a melting aid. It functions also to enhance ultraviolet absorption. If the content of $B_2O_3$ exceeds 5%, troubles arise in glass forming due to vaporization of $B_2O_3$, etc. Consequently, the upper limit of $B_2O_3$ content should be 5%.

If the ratio of the amount of FeO to that of T—$Fe_2O_3$ is too small, sufficient heat radiation absorbing power cannot be obtained because of the too small FeO amount. On the other hand, if the FeO/T—$Fe_2O$ ratio is too large, the range of absorption by FeO extends even into a longer-wavelength range in the visible region, so that the glass has a reduced visible light transmittance and a blue tint. Furthermore, too large FeO/T—$Fe_2O_3$ ratios are undesirable in that since the melt of such a glass is on the reduction side, there are cases where not only nickel sulfide stones generate in the glass but also silica-rich streaks or a silica scum generates. In the invention, the FeO/T—$Fe_2O_3$ ratio is preferably regulated to 20 to 60%, whereby a green glass having high ultraviolet absorbing power and high heat radiation absorbing power is obtained. The FeO amount used for expressing the FeO/T—$Fe_2O_3$ ratio is a value calculated in terms of $Fe_2O_3$.

It is preferred to add at least one of $Sb_2O_3$, $SnO_2$, and the like as a reducing agent or refining agent in a total amount of up to 1%. It is also preferred to add up to 1% ZnO in order to prevent the generation of nickel sulfide stones more surely.

The glass of the invention has a composition within such a range that the glass can be inhibited from suffering a color change through a heat treatment. Consequently, the difference between the saturation, indicating color tone, of the glass before a heat treatment and that after the treatment is preferably within 0.5. Namely, the glass which has undergone the heat treatment preferably has a reduced saturation.

The main use of the glass according to the invention is as an automotive window glass. For the purpose of safety, the glass is usually heat-tempered by air blast cooling.

The invention will be described in more detail by reference to the following Examples and Comparative Examples.

EXAMPLES 1 TO 15 AND COMPARATIVE EXAMPLES 1 TO 4

Typical soda-lime silica glass batch materials were suitably mixed with ferric oxide, cerium oxide, cobalt oxide, nickel oxide, selenium metal, chromium oxide, manganese oxide, copper oxide, neodymium oxide, erbium oxide, titanium oxide, molybdenum oxide, vanadium pentoxide, lanthanum oxide, and a carbonaceous reducing agent (e.g., carbon powder). The resultant batch was heated to 1,500° C. in an electric furnace to melt it. After the batch was kept molten for 4 hours, the resultant molten glass was cast on a stainless-steel plate and annealed to obtain a glass plate having a thickness of about 6 mm. This glass plate was polished so as to have a thickness of 4 mm to obtain a sample.

Optical characteristics of the sample obtained were measured. The optical characteristics included visible light transmittance (YA) measured with CIE standard illuminant A, total solar energy transmittance (TG), ultraviolet transmittance (Tuv) defined by ISO 9050, dominant wavelength ($\lambda$d) and excitation purity (Pe) both measured with the CIE standard illuminant C, and chromaticities a* and b* measured by JIS Z 8722 (1994).

In Examples 12 to 15, the samples were heat-tempered by reheating at 700° C. for 5 minutes and subsequent cooling by 20° C. air blowing at wind pressure of 21 to 31 MPa (2.1 to 3.2 kgf/mm²), and capacity of 0.6 to 0.7 Nm³/min. The optical characteristics of each sample were measured before and after the heat-tempering.

In Table 1 are shown the composition of base glass components, concentrations of coloring agents, and FeO/T—$Fe_2O_3$ ratio of each sample obtained. All values of component amounts in the Table are given in terms of % by weight unless otherwise indicated. In Table 1 are also shown the values of optical characteristics for each sample.

TABLE 1

| | | Example | | | | | | | | | | |
|---|---|---|---|---|---|---|---|---|---|---|---|
| | | 1 | 2 | 3 | 4 | 5 | 6 | 7 | 8 | 9 | 10 | 11 |
| Glass | $SiO_2$ | 70.1 | 71.5 | 71.4 | 70.3 | 68.4 | 71.2 | 71.0 | 70.8 | 71.0 | 70.3 | 71.5 |
| Composition | $Al_2O_3$ | 1.6 | 1.6 | 1.6 | 1.6 | 1.6 | 1.7 | 2.1 | 2.1 | 2.1 | 1.6 | 1.6 |
| (wt %) | MgO | 3.4 | 3.7 | 3.7 | 3.4 | 3.3 | 3.4 | 1.7 | 1.7 | 1.7 | 3.4 | 3.7 |
| | CaO | 7.6 | 7.7 | 7.7 | 7.6 | 7.0 | 7.3 | 8.3 | 8.3 | 8.3 | 7.6 | 7.7 |
| | $Na_2O$ | 14.0 | 13.8 | 13.8 | 14.0 | 14.0 | 14.6 | 14.6 | 14.6 | 14.6 | 14.0 | 13.8 |
| | $K_2O$ | 0.9 | 0.9 | 0.9 | 0.9 | 0.9 | 1.0 | 1.0 | 0.9 | 1.0 | 0.9 | 0.9 |
| | $B_2O_3$ | | | | | 4.0 | | | | | | |
| | NiO (ppm) | 60 | 50 | 25 | 30 | 15 | 15 | 100 | 10 | 50 | 20 | 30 |
| | CoO (ppm) | 9 | 5 | 10 | 2 | 7 | 5 | 3 | 5 | 5 | 3 | 7 |
| | $CeO_2$ | 1.70 | 0.10 | 0.20 | 0.75 | 0.10 | 0.20 | 1.00 | 0.60 | 0.30 | 0.20 | 0 |
| | $TiO_2$ | 0.10 | 0.03 | 0.06 | 0.75 | | | 0.05 | | | | 0.03 |

TABLE 1-continued

|  |  |  |  |  |  | $Er_2O_3$: 0.05 | $Nd_2O_3$: 0.05 | $La_2O_3$: 0.1 | $Cr_2O_3$: 0.035 | $V_2O_3$: 0.09 | Se: 0.0002 |  |
| --- | --- | --- | --- | --- | --- | --- | --- | --- | --- | --- | --- | --- |
|  | T-$Fe_2O_3$ | 0.62 | 0.75 | 0.75 | 0.65 | 0.65 | 0.68 | 0.55 | 0.65 | 0.64 | 0.70 | 0.85 |
|  | FeO | 0.10 | 0.15 | 0.15 | 0.20 | 0.16 | 0.21 | 0.17 | 0.19 | 0.19 | 0.19 | 0.21 |
|  | FeO/T-$Fe_2O_3$ (%) | 18.5 | 21.6 | 22.2 | 33.4 | 26.8 | 35.2 | 33.3 | 32.5 | 33.5 | 30.2 | 25.1 |
| Optical Character- istics | Thickness (mm) | 4 | 4 | 4 | 4 | 4 | 4 | 4 | 4 | 4 | 4 | 4 |
|  | YA (%) | 76.1 | 73.5 | 73.6 | 70.8 | 75.2 | 72.7 | 74.0 | 70.1 | 70.0 | 72.7 | 70.2 |
|  | TG (%) | 58.9 | 51.2 | 51.4 | 44.2 | 51.4 | 44.9 | 50.2 | 45.0 | 46.8 | 46.3 | 44.3 |
|  | L* | 90.10 | 89.18 | 89.30 | 87.89 | 90.11 | 89.48 | 88.02 | 87.97 | 89.80 | 87.85 |  |
|  | a* | −5.40 | −6.66 | −6.71 | −8.47 | −6.07 | −7.88 | −6.26 | −13.00 | −8.49 | −7.44 | −8.39 |
|  | b* | 5.18 | 2.51 | 1.40 | 4.93 | −0.59 | −2.15 | 0.66 | 4.69 | −1.06 | −0.38 | 1.03 |
|  | λd (nm) | 558.2 | 517.3 | 504.2 | 540.7 | 494.4 | 491.6 | 499.7 | 515.7 | 493.8 | 505.6 | 500.3 |
|  | Pe (%) | 4.3 | 1.8 | 2.2 | 3.6 | 3.4 | 5.6 | 2.5 | 3.7 | 5.0 | 2.5 | 3.3 |
|  | Tuv (ISO) (%) | 10.1 | 18.8 | 17.0 | 10.7 | 17.5 | 22.8 | 17.8 | 18.0 | 16.3 | 18.4 | 18.3 |

|  |  | Example | | | |
| --- | --- | --- | --- | --- | --- |
|  |  | 12 | 13 | 14 | 15 |
| Glass Composition (wt %) | $SiO_2$ | 71.4 | 68.4 | 71.2 | 71.5 |
|  | $Al_2O_3$ | 1.6 | 1.6 | 1.7 | 1.6 |
|  | MgO | 3.7 | 3.3 | 3.4 | 3.7 |
|  | CaO | 7.7 | 7.0 | 7.3 | 7.7 |
|  | $Na_2O$ | 13.8 | 14.0 | 14.6 | 13.8 |
|  | $K_2O$ | 0.9 | 0.9 | 1.0 | 0.9 |
|  | $B_2O_3$ |  | 4.0 |  |  |
|  | NiO (ppm) | 25 | 15 | 15 | 50 |
|  | CoO (ppm) | 1 | 7 | 5 | 5 |
|  | $CeO_2$ | 0.2 | 0.10 | 0.20 | 0 |
|  | $TiO_2$ | 0.03 |  |  | 0.05 |
|  |  |  | $Er_2O_3$: 0.05 | $Nd_2O_3$: 0.05 |  |
|  | T-$Fe_2O_3$ | 0.75 | 0.65 | 0.68 | 0.75 |
|  | FeO | 0.15 | 0.16 | 0.21 | 0.19 |
|  | FeO/T-$Fe_2O_3$ (%) | 22.2 | 26.8 | 35.2 | 28.7 |
|  |  | Before tempering | After tempering | Before tempering | After tempering | Before tempering | After tempering | Before tempering | Before tempering |
| Optical Character- istics | Thickness (mm) | 4 | | 4 | | 4 | | 4 | |
|  | YA (%) | 76.3 | 76.2 | 75.2 | 75.3 | 72.7 | 72.5 | 71.4 | 70.9 |
|  | TG (%) | 52.7 | 53.1 | 51.4 | 51.9 | 44.9 | 44.8 | 46.3 | 46.4 |
|  | L* | 90.46 | 90.38 | 90.11 | 90.13 | 89.24 | 89.06 | 88.37 | 88.08 |
|  | a* | −6.66 | −6.33 | −6.07 | −5.73 | −7.88 | −7.53 | −7.86 | −7.30 |
|  | b* | 2.88 | 3.50 | −0.59 | −0.02 | −2.15 | −1.80 | 1.04 | 1.52 |
|  | Saturation | 7.26 | 7.24 | 6.10 | 5.73 | 8.17 | 7.74 | 7.93 | 7.46 |
|  | λd (nm) | 524.4 | 538.0 | 494.4 | 496.4 | 491.6 | 492.0 | 500.7 | 506.6 |
|  | Pe (%) | 2.0 | 2.4 | 3.4 | 2.8 | 5.6 | 5.1 | 3.1 | 2.6 |
|  | Tuv (ISO) (%) | 17.1 | 14.4 | 17.5 | 14.50 | 22.8 | 19.7 | 21.5 | 18.2 |

The samples obtained in Examples 1 to 15 are within the scope of a first aspect of the invention with respect to composition and properties. As apparent from Table 1, the samples obtained in Examples 1 to 15 each had a visible light transmittance (YA) as measured with the CIE standard illuminant A of 70% or more, a total solar energy transmittance (TG) of 60% or less, and an ultraviolet transmittance (Tuv) defined in ISO 9050 of 25% or less, when it had a thickness of 4 mm. Each of these samples was a green glass having a dominant wavelength (λd) of from 490 to 560 nm and an excitation purity (Pe) of less than 6%, which were measured with the CIE standard illuminant C. These samples each is within the scope of third aspect of the invention with respect to the composition of base glass components.

Of these samples, the samples obtained in Examples 2 to 11 each had a FeO/T—$Fe_2O_3$ ratio within the range shown in a fifth aspect of the invention. Table 1 shows that the samples obtained in Examples 2 to 5 and 7 to 11 had the preferred properties shown in a seventh aspect of the invention.

With respect to the samples obtained in Examples 12 to 15, the glass compositions thereof and the optical characteristics thereof as measured before and after heat-tempering are shown. Example 13 corresponds to Example 5, and Example 14 corresponds to Example 6. The samples obtained in Examples 11 to 13 each had preferred properties within the ranges shown in a seventh aspect of the invention. As a result of the heat-tempering, the ultraviolet transmittances thereof were improved by 2% or more. The saturation of each sample decreased through the heat-tempering, and the change thereof was within −0.5. This inhibition of color change was attributable to a combination of a change in absorption by $Ni^{2+}$ through heat-tempering and a change in absorption through heat-tempering due to an interaction mainly between $Fe^{3+}$ and $Ce^{3+}$.

TABLE 2

| | | Comparative Example | | |
|---|---|---|---|---|
| | | 1 | 2 | 3 |
| Glass Composition (wt %) | SiO₂ | 71.5 | 71.1 | 70.8 |
| | Al₂O₃ | 1.6 | 1.6 | 2.1 |
| | MgO | 3.7 | 3.7 | 1.7 |
| | CaO | 7.7 | 7.7 | 8.3 |
| | Na₂O | 13.8 | 13.8 | 14.6 |
| | K₂O | 0.9 | 0.9 | 0.9 |
| | B₂O₃ | | | |
| | NiO (ppm) | 100 | 100 | 200 |
| | CoO (ppm) | | | 5 |
| | CeO₂ | | | 0.60 |
| | TiO₂ | 0.03 | 0.03 | 0.05 |
| | | | | Cr₂O₃:0.035 |
| | T—Fe₂O₃ | 0.75 | 1.25 | 0.74 |
| | FeO | 0.15 | 0.28 | 0.20 |
| | FeO/T—Fe₂O₃ (%) | 22.6 | 24.9 | 30.0 |
| Optical Characteristics | Thickness (mm) | 4 | 4 | 4 |
| | YA (%) | 72.7 | 60.8 | 56.4 |
| | TG (%) | 50.5 | 34.2 | 33.3 |
| | L* | 88.69 | 82.97 | 80.68 |
| | a* | −6.73 | −10.99 | −16.38 |
| | b* | 4.47 | 6.59 | 11.65 |
| | λd (nm) | 546.5 | 541.9 | 548.7 |
| | Pe (%) | 3.4 | 5.2 | 10.0 |
| | Tuv (ISO) (%) | 23.4 | 9.3 | 15.6 |

| | | Comparative Example 4 | |
|---|---|---|---|
| Glass Composition (wt %) | SiO₂ | 67.9 | |
| | Al₂O₃ | 2.9 | |
| | MgO | 1.6 | |
| | CaO | 9.2 | |
| | Na₂O | 14.7 | |
| | K₂O | 0.9 | |
| | B₂O₃ | | |
| | NiO (ppm) | | |
| | CoO (ppm) | 3 | |
| | CeO₂ | 1.25 | |
| | TiO₂ | 0.45 | |
| | T—Fe₂O₃ | 0.78 | |
| | FeO | 0.14 | |
| | FeO/T—Fe₂O₃ (%) | 19.6 | |
| | | Before tempering | After Tempering |
| Optical Characteristics | Thickness (mm) | 4 | |
| | YA (%) | 72.7 | 72.7 |
| | TG (%) | 47.9 | 48.0 |
| | L* | 88.77 | 88.72 |
| | a* | −8.29 | −8.13 |
| | b* | 5.78 | 6.42 |
| | Saturation | 10.11 | 10.36 |
| | λd (nm) | 548.6 | 552.8 |
| | Pe (%) | 4.5 | 5.1 |
| | Tuv (ISO) (%) | 7.9 | 5.9 |

On the other hand, the samples obtained in Comparative Examples 1 to 3 each had a composition outside the scope of the invention. Specifically, the sample of Comparative Example 1 was outside the scope of the invention with respect to CoO content and CeO₂ content, the sample of Comparative Example 2 was outside the scope of the invention with respect to total iron content, and the sample of Comparative Example 3 was outside the scope of the invention with respect to NiO content.

As apparent from these results, none of the glasses of Comparative Examples 1 to 3 was capable of satisfying the desired requirements concerning visible light transmittance, total solar energy transmittance, and ultraviolet transmittance.

Furthermore, the sample obtained in Comparative Example 4 was a glass having a composition outside the scope of the invention in that it contained no NiO. This sample came to have an increased saturation through heat-tempering and was hence undesirable from the standpoints of quality control and of obtaining desirable properties.

As described above in detail, the invention can provide an ultraviolet and infrared radiation absorbing glass which has a high visible light transmittance and a green tint. In particular, an ultraviolet and infrared radiation absorbing green glass which, when heat-tempered before use, is inhibited from changing in color tone through the heat-tempering and which is hence especially suitable for use as an automotive window glass can be provided by the invention.

What is claimed is:

1. An ultraviolet and infrared radiation absorbing green glass comprising:

in % by weight,
    as coloring components,
        0.5 to 1.1%, excluding 0.5%, total iron oxide in terms of $Fe_2O_3$ (T—$Fe_2O_3$);
        0.1 to 2.0% $CeO_2$
        0 to 1.0% $TiO_2$
        0.0005 to 0.01% NiO; and
        0.0001 to 0.001% CoO;
        wherein, when glass has a thickness of 4 mm, the glass has a visible light transmittance (YA) of 70% or more, a total solar energy transmittance (TG) of 60% or less, and an ultraviolet transmittance defined by ISO 9050 (Tuv) of 25% or less.

2. The ultraviolet and infrared radiation absorbing green glass as claimed in claim 1, which comprises:

in % by weight,
    as base glass components,
        65 to 80% $SiO_2$;
        0 to 5% $Al_2O_3$;
        0 to 10% MgO;
        5 to 15% CaO;
        10 to 20% $Na_2O$;
        0 to 5% $K_2O$; and
        0 to 5% $B_2O_3$;
        wherein the sum of MgO and CaO is 5 to 15% and the sum of $Na_2O$ and $K_2O$ is 10 to 20%.

3. The ultraviolet and infrared radiation absorbing green glass as claimed in claim 1, wherein the content of the T—$Fe_2O_3$ is from 0.6 to 1.1%, excluding 0.6%.

4. The ultraviolet and infrared radiation absorbing green glass as claimed in claim 1, wherein FeO in terms of $Fe_2O_3$ accounts for 20 to 60% of the T—$Fe_2O_3$.

5. The ultraviolet and infrared radiation absorbing green glass as claimed in claim 1, which further comprises 0.0001 to 0.1% by weight in total of at least one selected from the group consisting of Se, $Cr_2O_3$, $Mn_2O_3$, CuO, $Nd_2O_3$, $Er_2O_3$, $MoO_3$, $V_2O_5$ and $La_2O_3$.

6. The ultraviolet and infrared radiation absorbing green glass as claimed in claim 1, wherein, when the glass has a thickness of 4 mm, the glass has a visible light transmittance (YA) of 70% or more, a total solar energy transmittance (TG) of 53% or less, and an ultraviolet transmittance defined by ISO 9050 (Tuv) of 20% or less.

7. The ultraviolet and infrared radiation absorbing green glass as claimed in claim 1, wherein the difference between the saturation of the glass before a heat treatment and that after the treatment is within 0.5, the saturation being determined from chromaticities a* and b* in the CIE 1976 L*a*b* color system using the following equation (1):

$$\text{Saturation } (a^{*2}+b^{*2})^{1/2} \qquad (1).$$

8. The ultraviolet and infrared radiation absorbing green glass as claimed in claim 7, wherein the heat treatment is a heat-tempered treatment by air blast cooling.

9. The ultraviolet and infrared radiation absorbing green glass as claimed in claim 1, which is a sheet glass formed by a float process and has undergone a heat-tempered treatment.

* * * * *